UNITED STATES PATENT OFFICE.

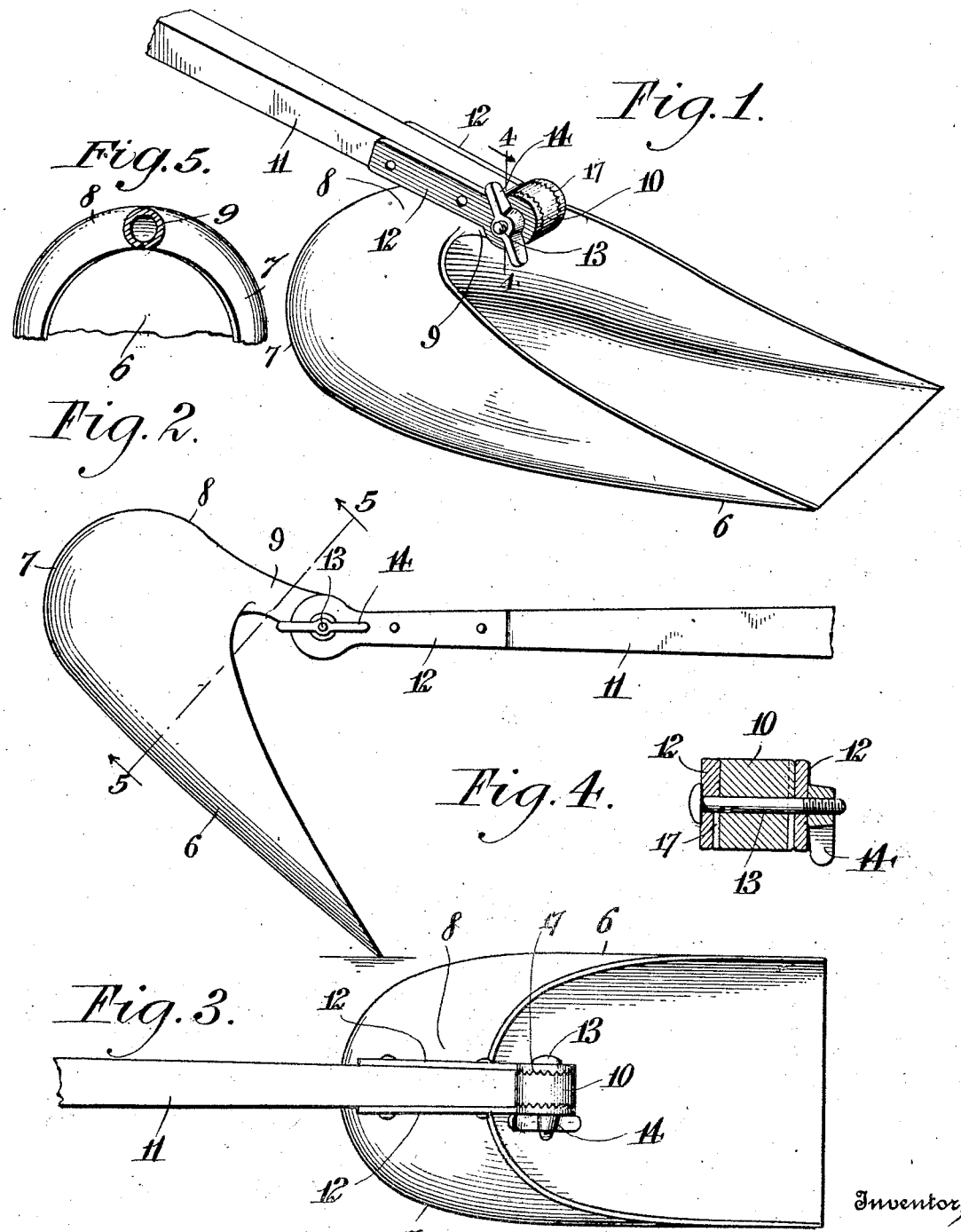

OLE SANDBERG, OF OGEMA, SASKATCHEWAN, CANADA.

COMBINATION SHOVEL AND HOE.

1,109,469.    Specification of Letters Patent.    Patented Sept. 1, 1914.

Application filed June 21, 1913. Serial No. 775,084.

*To all whom it may concern:*

Be it known that I, OLE SANDBERG, a citizen of Canada, residing at Ogema, in the Province of Saskatchewan and Dominion of Canada, have invented new and useful Improvements in Combination Shovels and Hoes, of which the following is a specification.

This invention relates to a combined shovel and hoe, and it has for its principal object to produce a tool of this character which may be conveniently and effectively utilized either as a shovel, as a hoe for hacking in the ground, or as a scraping hoe for moving and shifting material, unloading sand, gravel and the like from flat cars and for such other purposes as will suggest themselves.

A further object of the invention is to produce a tool of the type set forth which will be simple, inexpensive, easily adjusted to various positions for various purposes and which will be in all respects useful and labor-saving.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a perspective view of a tool constructed in accordance with the invention, showing the same adjusted for use as a shovel. Fig. 2 is a side elevation, showing the tool adjusted for use as a hoe. Fig. 3 is a top plan view of the device as seen in Fig. 1. Fig. 4 is a sectional detail view taken on the line 4—4 in Fig. 1. Fig. 5 is a sectional detail view taken on the line 5—5 in Fig. 2.

Corresponding parts in the several figures are denoted by like characters of reference.

The body 6 of the improved tool is of the general shape and outline of an ordinary scoop shovel, except that the rear portion thereof is bellied to form a socket or pocket portion 7 of some considerable depth, the top wall 8 of said socket or pocket portion being provided with a shank 9 that extends forwardly in the direction of the front edge of the scoop blade, said shank being formed integrally with the body of the scoop or shovel by bending a portion of the material into approximately circular shape in cross section, as clearly seen by reference to Fig. 5, thus providing an extremely strong and durable and at the same time a light construction. The shank 9 extends obliquely in an upward direction with respect to the bottom of the scoop body, and it carries a terminal head 10 which is positioned above the scoop blade intermediate and nearly midway between the front and rear ends thereof, thus enabling said shovel, whether loaded or unloaded, to be nicely balanced by said head.

A handle 11 is provided, said handle having terminal lugs or cheek plates 12 receiving between them the head 10 of the shank 9, said head being mounted pivotally on a bolt 13 having a wing nut 14, which latter, when tightened, serves to secure the parts in assembled relation. The tightening action may be increased by providing the opposed faces of the head 10 and the cheek plates 12 with substantially radial corrugations, indicated at 17.

It will be readily seen that by loosening the wing nut the handle may be tilted or moved to various positions with relation to the scoop; thus when the handle extends rearwardly with respect to the scoop, the device may be utilized as a shovel; when the handle is tilted forwardly with respect to the scoop, the latter may be utilized as a hoe for hacking in the ground or for scraping material in order to move it from place to place. It is obvious that the handle may be readily adjusted to and secured in the most advantageous position for the work that is to be performed. It will also be seen that the handle, owing to the peculiar construction of the shovel body or scoop, is joined with the latter at a point intermediate the ends thereof. Thus, when the tool is used as a shovel, the load will be supported partly in front and partly in rear of the bolt or pivot member, thereby avoiding undue strain, and also placing the load nearer the operator than would be the case if the entire shovel body were to extend forwardly with respect to the handle, thereby permitting the load to be handled with less expenditure of power. In the same way, the operation of the tool as a hoe is improved and facilitated, large quantities of material being conveniently handled thereby without undue expenditure of power.

Having thus described the invention, what is claimed as new, is:—

In a device of the class described, a body member of the general outline of a scoop shovel having its rear end bellied to form a relatively deep pocket and having an integral tubular shank extending upwardly and forwardly from the top wall of said pocket, a terminal head carried by said shank, a handle member pivotally connected with the head, and means for securing the handle rigidly with respect to the body member at extreme and intermediate adjustments.

In testimony whereof I affix my signature in presence of two witnesses.

OLE SANDBERG.

Witnesses:
 HATTIE E. HORNER,
 CLARENCE E. HORNER.